United States Patent
Fletcher

(10) Patent No.: US 9,752,462 B1
(45) Date of Patent: Sep. 5, 2017

(54) SUPERCRITICAL FLUID HEAT ENGINE

(71) Applicant: ROLLS-ROYCE PLC, London (GB)

(72) Inventor: Paul Fletcher, Rugby (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 15/426,577

(22) Filed: Feb. 7, 2017

(30) Foreign Application Priority Data

Mar. 3, 2016 (GB) .................................. 1603699.8

(51) Int. Cl.
| | |
|---|---|
| *F02C 6/18* | (2006.01) |
| *F02C 1/10* | (2006.01) |
| *F01K 25/10* | (2006.01) |
| *F01K 23/10* | (2006.01) |
| *F01K 7/16* | (2006.01) |
| *F01K 11/02* | (2006.01) |
| *F02C 6/14* | (2006.01) |
| *F02C 6/00* | (2006.01) |
| *F02C 6/16* | (2006.01) |

(52) U.S. Cl.
CPC ............ *F01K 25/103* (2013.01); *F01K 7/165* (2013.01); *F01K 11/02* (2013.01); *F01K 23/10* (2013.01); *F02C 1/10* (2013.01); *F02C 1/105* (2013.01); *F02C 6/00* (2013.01); *F02C 6/14* (2013.01); *F02C 6/16* (2013.01); *F02C 6/18* (2013.01); *Y02E 20/16* (2013.01)

(58) Field of Classification Search
CPC ........ F01K 25/103; F01K 7/165; F01K 11/02; F01K 23/10; F02C 6/18; F02C 6/16; F02C 6/00; F02C 1/10; F02C 6/14; F02C 1/105; Y02E 20/16
USPC ............................ 60/39.182, 650, 682–684
See application file for complete search history.

(56) References Cited

U.S. PATENT DOCUMENTS

| 3,390,525 | A | * | 7/1968 | Spillmann | ............... | F01D 11/04 |
| | | | | | | 376/310 |
| 3,962,864 | A | * | 6/1976 | Williams | ............... | F02C 6/006 |
| | | | | | | 165/104.31 |

(Continued)

FOREIGN PATENT DOCUMENTS

| CN | 103590863 A | 2/2014 |
| CN | 103790662 A | 5/2014 |

OTHER PUBLICATIONS

Sep. 28, 2016 Search Report issued in British Patent Application No. GB1603699.8.

*Primary Examiner* — Hoang Nguyen
(74) *Attorney, Agent, or Firm* — Oliff PLC

(57) ABSTRACT

A supercritical working fluid closed cycle heat engine includes, in fluid flow series:
a heat source heat exchanger configured to raise the temperature of a working fluid;
an expander configured to extract work from the working fluid;
a condenser configured to exchange heat between the working fluid and the cooling medium;
and a separator configured to separate liquid phase working fluid from gaseous phase working fluid and deliver gaseous phase working fluid to a gaseous compressor and liquid phase working fluid to a fixed displacement liquid pump, the compressor and pump being arranged in parallel. Each of the compressor and fixed displacement pump are configured to return fluid to the heat source heat exchanger. The compressor comprises a variable inlet guide vane and a variable outlet diffuser vane.

11 Claims, 1 Drawing Sheet

(56) References Cited

U.S. PATENT DOCUMENTS

Figure 1:
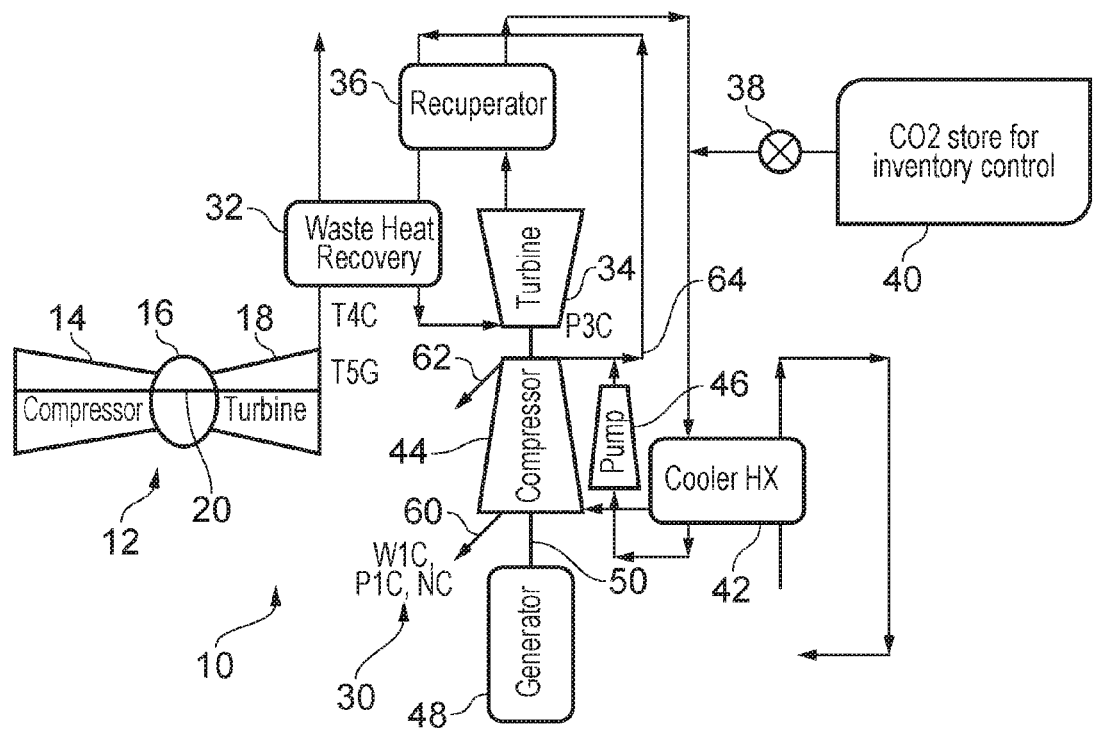

| | | | | |
|---|---|---|---|---|
| 4,827,723 A | * | 5/1989 | Engstrom | F01K 23/061 |
| | | | | 122/4 D |
| 8,048,276 B2 | * | 11/2011 | Balestrino | C25B 1/04 |
| | | | | 204/237 |
| 2002/0162330 A1 | | 11/2002 | Shimizu et al. | |
| 2006/0225423 A1 | * | 10/2006 | Brostow | F01K 21/005 |
| | | | | 60/650 |
| 2010/0199631 A1 | * | 8/2010 | Vilimec | F01K 21/045 |
| | | | | 60/39.182 |
| 2011/0100010 A1 | * | 5/2011 | Freund | F02C 1/005 |
| | | | | 60/659 |

\* cited by examiner

SUPERCRITICAL FLUID HEAT ENGINE

The present disclosure concerns a heat engine comprising a supercritical working fluid.

Heat engines employing supercritical working fluids as part of the thermodynamic cycle are known. One example comprises supercritical carbon dioxide ($sCO_2$). A supercritical fluid is a gas which is held at a temperature and pressure above a critical point for that fluid where distinct liquid and gaseous phases do not exist. A supercritical fluid therefore behaves like a gas, in that it will occupy all available volume, but has a density similar the liquid phase of the fluid. For example, supercritical $CO_2$ occurs where pure $CO_2$ is held at a temperature greater than 30°, and pressures greater than 70 atmospheres.

One known supercritical engine cycle is described in "Initial Test Results of a Megawatt-Class Supercritical $CO_2$ Heat Engine" by Timothy Held, presented at the 4th International Symposium of Supercritical CO2 Power Cycles held in Pittsburgh, Pa., USA on Sep. 9-10 2014. This describes a system in which $CO_2$ is utilised in a Brayton cycle heat engine, wherein the $CO_2$ is in a supercritical phase during at least part of the cycle. $sCO_2$ is pumped around a closed loop cycle, in which the working fluid is in turn heated in a temperature raising heat exchanger, expanded in a turbine and cooled by a condenser, before being pumped back around by the pump. Work from the turbine powers the pump, and also a generator. $CO_2$ (which may be in a liquid, gaseous or supercritical phase) is held in a storage vessel, and removed or added to the cycle in order to maintain system pressure in response to fluctuations in process temperature. Such a system, in which working fluid mass can be altered during operation, is known in the art as "inventory control". Operational control of the cycle is provided by throttle valves, which control working fluid flow rates to maintain temperatures and pressures within an operating range.

Such a system is highly efficient and compact. However, such systems are relatively inflexible, since the system efficiency and available power will be dependent on the temperature of the cooling fluid used to cool the working fluid in the condenser. If this temperature varies (as will be the case where atmospheric air or sea water is used as the coolant), then the condenser may not cool the $CO_2$ sufficiently to produce liquid or supercritical $CO_2$, which will then require a compressor to raise the pressure of the working fluid. A compressor must necessarily use more power to pump a given mass of fluid to a given pressure than a liquid phase pump, resulting in lower cycle efficiency. On the other hand, where a compressor is provided, such devices generally have a relatively narrow band of operating flow at a given level of pressure ratio (i.e. the ratio between the inlet and outlet pressures) under which they can operate without stalling. Furthermore, variation in heat input to the working fluid in the temperature raising heat exchanger will also affect the efficiency of the system, and the condenser will only be able to handle a fixed volume of working fluid. Furthermore, such systems are generally slow to react to increased or reduced power demand due to thermal inertia.

Consequently, it is desirable to provide a supercritical working fluid heat engine and a method of operating such an engine which is highly efficient at different operating temperatures, and is capable of varying its output power quickly.

According to a first aspect of the invention there is provided a supercritical working fluid closed cycle heat engine comprising, in fluid flow series:

a heat source heat exchanger configured to raise the temperature of a working fluid;
an expander configured to extract work from the working fluid;
a heat exchanger configured to exchange heat between the working fluid and the cooling medium; and
a separator configured to separate liquid phase working fluid from gaseous phase working fluid and deliver gaseous phase working fluid to a gaseous compressor and liquid phase working fluid to a fixed displacement liquid pump, the compressor and pump being arranged in parallel;
each of the compressor and fixed displacement pump being configured to return fluid to the heat source heat exchanger;
wherein the compressor comprises a variable inlet guide vane and a variable outlet diffuser vane.

Consequently, the heat engine is capable of operating over a wide range of heat source and cold source temperatures, while providing high efficiency and high reliability. By pumping as much liquid as possible, and compressing the gaseous phase of the working fluid separately, the power absorbed to raise the pressure is reduced. On the other hand, since the relative amounts of liquid and gaseous phase working fluids will change depending on cycle pressure and temperatures, the volume of gaseous phase working fluid will vary considerably. The invention solves this problem by providing a gaseous phase compressor having a variable inlet guide vane and a variable outlet diffuser vane, which is therefore capable of accepting a wide variation in gaseous fluid flow volume.

The heat source may comprise an exhaust gas of a gas turbine engine comprising a core compressor, a combustor and a core turbine. Alternatively or in addition, the heat source may comprise one of a reciprocating internal combustion engine, a nuclear reactor, and other heat sources. The heat source may comprise a heat exchanger configured to exchange heat between exhaust gasses from the gas turbine engine and the working fluid of the heat engine.

The engine may comprise a recuperator heat exchanger configured to exchange heat between working fluid downstream of the expander and working fluid upstream of the heat source heat exchanger.

The engine may comprise a working fluid storage vessel configured to control engine cycle working fluid mass via a control valve.

The compressor may comprise a centrifugal compressor. The pump may comprise a fixed displacement pump.

According to a second aspect of the present invention there is provided a method of operating a heat engine in accordance with the first aspect of the present invention, the method comprising the steps of:

determining a temperature difference across the heat source heat exchanger; and
controlling the gaseous compressor rotational speed such that the temperature difference matches a target value.

The method may further comprise determining a gaseous compressor inlet pressure, and controlling the working fluid storage vessel control valve to maintain gaseous compressor inlet pressure at a target value.

The method may comprise determining a gaseous compressor outlet pressure, and the target gaseous compressor inlet pressure may be determined in accordance with a schedule relating compressor pressure ratio and the temperature difference across the heat source heat exchanger.

The method may comprise controlling the compressor variable inlet guide vane and a variable outlet diffuser vane on the basis of a schedule relating vane angle and one or more of compressor speed, compressor inlet mass flow, compressor inlet temperature, and compressor inlet pressure.

The skilled person will appreciate that except where mutually exclusive, a feature described in relation to any one of the above aspects of the invention may be applied mutatis mutandis to any other aspect of the invention.

Figure 2:
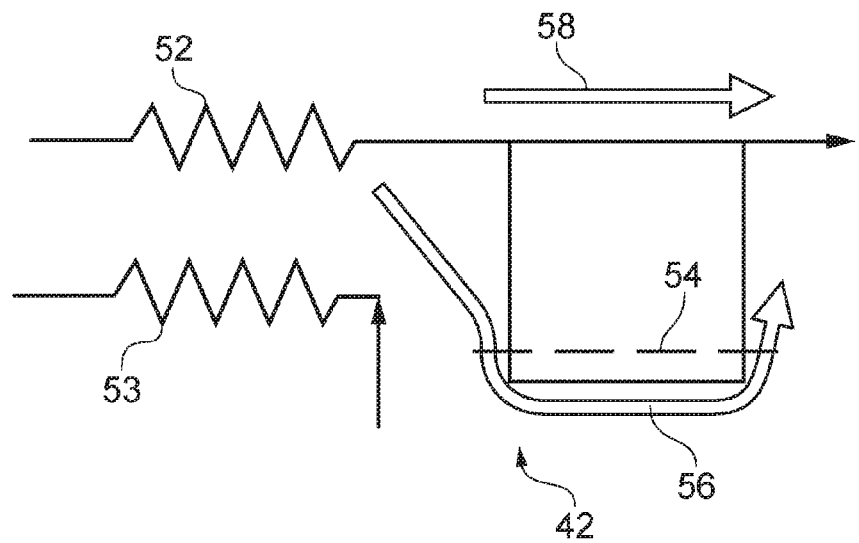

Embodiments of the invention will now be described by way of example only, with reference to the Figures, in which:

FIG. 1 is a schematic view of a heat engine in accordance with the present invention; and FIG. 2 is a schematic view of a component part of the heat engine shown in FIG. 1.

With reference to FIG. 1, a heat engine is generally indicated at 10. The heat engine uses a working fluid which is supercritical during at least part of the cycle. The cycle typically uses $CO_2$ as its working fluid, though it will be understood that other supercritical working fluids could be employed.

The heat engine 10 comprises a heat source in the form of a gas turbine engine 12. The gas turbine engine comprises an open Brayton cycle heat engine, compressor a gaseous phase core air compressor 14, a combustor 16, and a gaseous phase core turbine 18. In operation, air is directed into the compressor 14 at a compressor inlet temperature T1G and a compressor inlet pressure P1G where it is compressed and directed into the combustor 16. Fuel is added and combusted in the combustor 16, thereby raising its temperature. The combustion products are directed to the turbine 18 at a turbine inlet temperature T4G and turbine inlet pressure P4G, where the gas is expanded, thereby reducing the pressure and temperature of the combustion gasses to a turbine outlet temperature T5G and pressure P5G, and driving the turbine 18. The compressor 14 and turbine 18 are interconnected by a shaft 20, such that rotation of the turbine 18 drives the compressor 14.

The gas turbine engine 18 is open cycle, such that exhaust gasses from the turbine 18 are ultimately vented to the atmosphere. However, the exhaust gasses from the gas turbine engine are at a relatively high temperature, and so, prior to venting to the atmosphere, exhaust gasses are passed through a waste heat recovery heat exchanger 32, which thereby heats a working fluid of a closed cycle heat recovery engine 30. The closed cycle heat recovery engine 30 includes the cold side of the waste heat recovery heat exchanger 32, a turbine 34, a recuperator 36, a working fluid storage container 40 and controlling valve 38, a cooler/condenser 42, a gaseous phase compressor 44, a liquid phase pump 46, a generator 48 and a shaft 50. The operation and interconnection of each of these components is described in further detail below.

Heated working fluid from the waste heat recovery heat exchanger 32 at a temperature T4C and pressure P4C is delivered to an inlet of the turbine 34 where it is expanded, thereby reducing the temperature T5V and pressure P5C and driving the turbine 34, and thereby also the gaseous phase compressor 44 via the interconnecting shaft 50. A load such as an electrical generator 48 is also coupled to the shaft 50, and so the heat engine provides useful output power.

Cooled working fluid downstream of the turbine 34 is passed to a hot side of a recuperator heat exchanger 36, which is thereby cooled. Cooled working fluid is then passed to a cooler heat exchanger 42, which further cools the working fluid.

The cooler heat exchanger 42 is shown in further detail in FIG. 2. The cooler heat exchanger 42 exchanges heat between the working fluid and a cooling medium (for example cold water) to thereby cool the working fluid. The cooling medium may comprise water from an environmental source such as sea water, which may be at a variable temperature. The cooler heat exchanger 42 comprises a working fluid inlet channel 52, which is in thermal contact with a coolant channel 53 to cool the working fluid. Downstream of the area of thermal contact with the coolant channel 53, the working fluid is cooled to a low temperature and pressure, such that the working fluid is no longer supercritical, i.e. it has distinct liquid and gaseous phases, which may be mixed together. The working fluid is separated into its gaseous and liquid phases by a separator comprising a grid 54 comprising a plurality of apertures to allow liquid phase working fluid to enter a liquid phase outlet channel 56. Gaseous phase working fluid continues, and exits through a gaseous phase outlet channel 58.

The gaseous phase working fluid is directed through the channel 58 to the gaseous phase compressor 44. The compressor 44 is configured to compress the gaseous phase working fluid, to thereby raise its pressure prior to delivery downstream. The compressor 44 comprises variable geometry features, including a variable area inlet guide vane 60, and a variable area outlet diffuser 62. The compressor typically comprises a centrifugal impellor. The variable area inlet guide vane 60 is controllable to control the area of the compressor inlet, to thereby control mass flow and inlet pressure to the compressor 44. Similarly, the variable area outlet diffuser is controllable to vary the outlet pressure of the compressor 44. In conjunction, the guide vanes 60 and diffuser 62 control the pressure ratio and mass flow of the compressor 44. The compressor 14 is configured to raise the temperature and pressure of the working fluid to above the supercritical temperature and pressure of the working fluid.

The liquid phase working fluid is directed through the channel 56 to the liquid phase pump 46. The pump 46 is configured to operate on the liquid phase working fluid, to thereby raise its pressure prior to delivery downstream. The pump 46 comprises a fixed displacement pump, which is typically driven by a separate shaft to the compressor 44, and may be driven by an electric motor for example. Typically, for a given mass flow rate, the work required to pump the liquid flow through the pump 46 is typically lower than the work required to compress the working fluid in the compressor 44. The pump 46 is configured to raise the temperature and pressure of the working fluid to above the supercritical temperature and pressure of the working fluid.

Downstream of each of the compressor 44 and pump 46 is a common manifold 64, which re-joins flows from the output of the compressor 44 and the pump 46. The working fluid flows downstream of the common manifold to a cold side of the recuperator 36, where the working fluid is re-warmed, prior to flowing back through the cold side of the waste heat recovery heat exchanger 32, where the cycle is repeated.

The working fluid ($CO_2$) inventory 40 is provided between the recuperator heat exchanger 32 hot side and the cooler heat exchanger 42. The inventory 40 comprises a pressurised container which stores working fluid to maintain a desired total pressure and mass within the heat engine cycle. Flow to and from the inventory 40 is controlled by a valve 38, which may also pump working fluid to and from the inventory. Under normal operation, working fluid may bypass the inventory 40, a portion of the working fluid may be withdrawn from the cycle, or additional working fluid may be added to the cycle.

The operating cycle of the above described heat engine is subject to various external factors which govern the power generated and operability of the engine. Firstly, the heat input into the hot side of the waste heat recovery heat exchanger 32 from the heat source (in this case the gas turbine engine 12) is dependent on the gas turbine engine turbine 18 exhaust mass flow rate W5G and temperature T5G. Each of these is in turn dependent on fuel flow and compressor inlet temperature T1G, which is in turn dependent on environmental air temperatures. Consequently, heat input to the waste heat recovery heat exchanger 32 is ultimately dependent on air temperature and fuel flow, which equates to power demand of the gas turbine engine 12. Similarly, the heat removal from the hot side of the cooler heat exchanger 42 is dependent on the temperature and flow rate of the coolant on the cold side of the heat exchanger. Where this coolant comprises an environmental fluid such as air or sea water, this temperature may vary considerably in operation, particularly where the system is used on a ship, which may travel between hot and cold geographic locations. Meanwhile, it is necessary that the cycle can operated efficiently and reliably throughout a wide range of input and output heating conditions.

The above described engines can accommodate such variations due to aspects of the design. The varying heat sink and cold sink temperatures of the cycle will result in many cases to only part of the working fluid being condensed to a liquid phase. By separating the working fluid into its two constituent phases, the gaseous phase can be compressed back to a supercritical state, while the liquid phase can be pumped, thereby using less power, while avoiding both pump cavitation and compressor stalling. Due to the varying volumes of gas and liquid state working fluid entering the compressor 44 and pump 46 respectively, the compressor is provided with variable area inlet guide vanes 60 and outlet diffuser vanes 62, to thereby accommodate the variable mass flows and pressure ratios provided over various temperature conditions at the heat exchangers 32, 42. Consequently, maximum use can be made of both low cold sink temperatures and high heat source temperatures and mass flows without encountering operational difficulties in other regimes. The provision of a liquid phase pump 46 also provides a means for starting the cycle using relatively little motive power.

In order to provide further flexibility in the operation of the system, the optional inventory 40 and valve 38 provide control over working fluid mass in the cycle, and so, for a given working fluid temperature, the pressure level in the system can be altered. Increasing the pressure level by adding working fluid from the inventory 40 via the valve 38 will tend to increase the mass flow of liquid phase working fluid to the pump 46, and reduce mass flow of gaseous phase working fluid to the compressor 44 inlet. Removing working fluid will have the opposite effect. Consequently, the valve 38 provides additional control over the operational cycle.

One proposed method of operation of the engine is as follows.

The gas turbine engine 12 is controlled using fuel injector actuators to control fuel flow, and optionally, compressor variable inlet guide vanes to control compressor compression ratio. The gas turbine engine 12 is controlled in a conventional manner as would be understood by the skilled person to obtain a desired power output and gas turbine entry temperature T4G. The turbine exhaust gas will be at a corresponding varying outlet temperature T5G.

Alternatively, the system may monitor the power output from the gas turbine engine turbine 18 and the heat recovery engine 34 to determine the current power output. The system may increase fuel flow until the total power generated is equal to the desired power. As the heat recovery turbine 34 power output would be expected to lag the gas turbine engine turbine 18 power output, this may result in an initially high output level from the gas turbine engine, followed by reduced operation as the heat recovery turbine 34 power output increases.

The temperature differential (T5G–T4C) across the waste heat recovery heat exchanger 32 is controlled by varying the gaseous compressor 44 (and possibly also liquid phase pump 46) rotational speed, to thereby control compressor outlet pressure P3C, and therefore working fluid density at the heat exchanger 32 inlet. In general, high mass flow rates will result in a higher temperature differential than a low mass flow rate for a given gas turbine outlet temperature T5G in view of the higher resultant density, and therefore higher available heat absorption capacity. Consequently, the waste heat recovery cycle can be controlled to accommodate increased or reduced heat input by increasing or reducing respectively heat exchanger mass flow rates.

In order to control compressor 44 inlet pressure P1C in order to maximise efficiency and minimise surge risks, the inventory control valve 38 is operated to add or remove working fluid from the cycle in accordance with a schedule of overall pressure ratio P3C/P1C (i.e. the ratio of the compressor outlet pressure to the compressor inlet pressure) vs gas turbine outlet temperature to compressor inlet temperature ratio (T5G/T1C). Consequently, the compressor overall pressure ratio can be controlled in accordance with heat exchanger temperature differential. As will be understood, the thermodynamically ideal compressor pressure ratio will be dependent on the temperature ratio across the cycle.

The variable inlet guide vane (60) and a variable outlet diffuser vane (62) may be modulated on the basis of a schedule relating vane (60, 62) angle and one or more of gaseous compressor (44) speed (NC), compressor (44) inlet mass flow (W1C), compressor (44) inlet temperature (P1C), and compressor (44) inlet pressure (T1C).

Simultaneously, in order to control gaseous phase compressor 44 surge margin SM1C, compressor variable inlet guide vane angle ANG1 and diffuser angle ANG3 are controlled in accordance with a schedule versus one or more of shaft rotational speed N1C, gaseous compressor working fluid mass flow W1C, gaseous compressor inlet temperature T1C, and gaseous compressor inlet pressure P1C.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

For example, the liquid phase pump and/or gaseous phase compressor may comprise a flow recirculation line to accommodate increased pressure ratios. The system may utilise a different heat source. The system may be suitable for land based power generation or aircraft power generation. The heat source could comprise a plurality of gas turbine or reciprocating engines. Different control methods could be employed. Multiple parallel or series gaseous phase compressors could be used. The gaseous flow compressor and turbine could be geared relative to one another. Where multiple series stage compressors are used, an intercooler heat exchanger could be provided.

The invention claimed is:

1. A supercritical working fluid closed cycle heat engine comprising, in fluid flow series:
   a heat source heat exchanger configured to raise the temperature of a working fluid;
   an expander configured to extract work from the working fluid;
   a heat exchanger configured to exchange heat between the working fluid and a cooling medium; and
   a separator configured to separate liquid phase working fluid from gaseous phase working fluid and deliver gaseous phase working fluid to a gaseous compressor and liquid phase working fluid to a fixed displacement liquid pump, the compressor and pump being arranged in parallel;
   each of the compressor and fixed displacement pump being configured to return fluid to the heat source heat exchanger;
   wherein the compressor comprises a variable inlet guide vane and a variable outlet diffuser vane.

2. An engine according to claim 1, wherein the heat source comprises an exhaust gas of a gas turbine engine comprising a core compressor, a combustor and a core turbine.

3. An engine according to claim 2, wherein the heat source comprises a heat exchanger configured to exchange heat between exhaust gasses from the gas turbine engine and the working fluid of the heat engine.

4. An engine according to claim 1, wherein the engine comprises a recuperator heat exchanger configured to exchange heat between working fluid downstream of the expander and working fluid upstream of the heat source heat exchanger.

5. An engine according to claim 1, wherein the engine comprises a working fluid storage vessel configured to control engine cycle working fluid mass via a control valve.

6. An engine according to claim 1, wherein the compressor comprises a centrifugal compressor.

7. A method of controlling an engine according to claim 1, the method comprising the steps of:
   determining a temperature difference across the heat source heat exchanger; and
   controlling the gaseous compressor rotational speed such that the temperature difference matches a target value.

8. A method according to claim 5, wherein the method further comprises determining a gaseous compressor inlet pressure, and controlling the working fluid storage vessel control valve to maintain gaseous compressor inlet pressure at a target value.

9. A method according to claim 8, wherein the method comprises determining a gaseous compressor outlet pressure, and the target gaseous compressor inlet pressure is determined in accordance with a schedule relating compressor pressure ratio and the temperature difference across the heat source heat exchanger.

10. A method according to claim 7, wherein the method comprises controlling the compressor variable inlet guide vane and a variable outlet diffuser vane on the basis of a schedule relating vane angle and one or more of compressor speed, compressor inlet mass flow, compressor inlet temperature, and compressor inlet pressure.

11. A method according to claim 7, wherein the method further comprises determining a gaseous compressor inlet pressure, and controlling the working fluid storage vessel control valve to maintain gaseous compressor inlet pressure at a target value.

* * * * *